United States Patent
Kassas et al.

(10) Patent No.: US 11,808,867 B2
(45) Date of Patent: Nov. 7, 2023

(54) SIMULTANEOUS TRACKING AND NAVIGATION USING LEO SATELLITE SIGNALS

(71) Applicant: The Regents of the University of California, Oakland, CA (US)

(72) Inventors: Zak Kassas, Irvine, CA (US); Josh Morales, Irvine, CA (US); Joe Khalife, Irvine, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 17/604,157

(22) PCT Filed: Apr. 15, 2020

(86) PCT No.: PCT/US2020/028282
§ 371 (c)(1),
(2) Date: Oct. 15, 2021

(87) PCT Pub. No.: WO2020/226862
PCT Pub. Date: Nov. 12, 2020

(65) Prior Publication Data
US 2022/0171077 A1    Jun. 2, 2022

Related U.S. Application Data

(60) Provisional application No. 62/934,481, filed on Nov. 12, 2019, provisional application No. 62/834,313, filed on Apr. 15, 2019.

(51) Int. Cl.
*G01S 19/49* (2010.01)
*G01S 19/52* (2010.01)
*G01C 21/16* (2006.01)

(52) U.S. Cl.
CPC ............. *G01S 19/49* (2013.01); *G01C 21/165* (2013.01); *G01C 21/188* (2020.08); *G01S 19/52* (2013.01)

(58) Field of Classification Search
CPC ....... G01S 19/49; G01S 19/52; G01C 21/188; G01C 21/165
(Continued)

(56) References Cited

U.S. PATENT DOCUMENTS 9,739,891 B2 *   8/2017   Kennedy ............. G01S 5/02521
10,063,311 B2 *  8/2018   Gopal ................. B64G 1/1021
(Continued)

OTHER PUBLICATIONS

Christian T. Ardito, Joshua J. Morales, Joe J. Khalife, Ali A. Abdallah, and Zaher M. Kassas, Performance Evaluation of Navigation Using LEO Satellite Signals with Periodically Transmitted Satellite Positions, Ion ITM Conference Restoration Jan. 28, 2019, 13 pages.

*Primary Examiner* — Harry K Liu
(74) *Attorney, Agent, or Firm* — Stites & Harbison PLLC; John Teresinski

(57) ABSTRACT

Systems, device configurations, and processes are provided for tracking and navigation using low-earth orbit satellite (LEO) signals. Embodiments are provided to track LEO satellites in the absence or during interrupted service by global position sources (e.g., GNSS). Operations and a framework are provided to use low-earth orbit (LEO) downlink transmissions as a source of positioning data. Operations can include performing a Doppler frequency measurement on received satellite downlink transmissions to determine a pseudorange rate measurement for a vehicle relative to at least one LEO satellite. Pseudorange rate measurements may be used to correct vehicle position data of a vehicles inertial navigation system (INS) and for control/navigation of the vehicle. Embodiments allow for (Continued)

simultaneous tracking of LEO satellites and navigation of a vehicle, such as an unmanned aerial vehicle. Embodiments are also directed to employing a propagation model for LEO position and velocity within a simultaneous tracking and navigation (STAN) framework.

16 Claims, 12 Drawing Sheets

(58) Field of Classification Search
USPC .......................................................... 342/352
See application file for complete search history.

(56) References Cited

U.S. PATENT DOCUMENTS

| | | |
|---|---|---|
| 11,595,115 B2 * | 2/2023 | Panthi ................ H04B 7/18578 |
| 2003/0132878 A1 | 7/2003 | Devereux et al. |
| 2008/0001818 A1 | 1/2008 | Cohen et al. |
| 2011/0238307 A1 * | 9/2011 | Psiaki .................... G01C 21/28 |
| | | 701/469 |
| 2014/0354477 A1 * | 12/2014 | Robinson ................ G01S 19/11 |
| | | 342/357.78 |

* cited by examiner

SIMULTANEOUS TRACKING AND NAVIGATION USING LEO SATELLITE SIGNALS

CROSS-REFERENCE TO RELATED APPLICATIONS

This application is the National Stage entry under 35 U.S.C. § 371 of International Application No. PCT/US2020/028282, filed Apr. 15, 2020, which claims priority to U.S. Provisional Application No. 62/834,313 titled LOW EARTH ORBIT SATELLITE SIGNAL AIDED INERTIAL NAVIGATION SYSTEM filed on Apr. 15, 2019 and U.S. Provisional Application No. 62/934,481 titled ORBIT MODELING FOR SIMULTANEOUS TRACKING AND NAVIGATION USING LEO SATELLITE SIGNALS filed on Nov. 12, 2019, the content of which is expressly incorporated by reference in its entirety.

STATEMENT OF GOVERNMENT SUPPORT

This invention was made with Government support under Grant No. N00014-19-2511, N00014-16-2305 awarded by the Office of Naval Research and Grant No. 175112050 and 1929965 awarded by the National Science Foundation (NSF). The Government has certain rights in the invention.

FIELD

The present disclosure generally relates to a simultaneous tracking and navigation (STAN) framework for Low Earth orbit (LEO) satellites.

BACKGROUND

Tens of thousands of broadband low Earth orbit (LEO) satellites are expected to be operational by the mid-2020s. These planned broadband LEO satellites along with current existing communication LEO satellites will bring an abundance of ambient radio frequency signals that may be treated as signals of opportunity (SOPs) for navigation in the inevitable event that global navigation satellite system (GNSS) signals become unavailable (e.g., in deep urban canyons and near dense foliage) or untrustworthy (e.g., during intentional and unintentional jamming and malicious spoofing attacks). In the absence of GNSS signals, LEO signals could be exploited to provide aiding corrections to a vehicle's inertial navigation system (INS).

SOPs have been considered as sources for navigation in the absence of GNSS signals. SOPs can include AM/FM radio, cellular, digital television, and LEO satellites.

It would be desirable to have a framework for correcting the position produced by an inertial navigation system when global navigation satellite system signals are unavailable or otherwise undesirable to use.

BRIEF SUMMARY OF THE EMBODIMENTS

Disclosed and claimed herein are systems, methods and configurations for navigation using low-earth orbit satellite (LEO) signals. In one embodiment, a method includes receiving, by a device, a low-earth orbit (LEO) satellite downlink transmission, and performing, by the device, a Doppler frequency measurement on received satellite downlink transmissions to determine a pseudorange rate measurement for a vehicle relative to at least one LEO satellite. The method also includes correcting, by the device, position data of a vehicle inertial navigation system (INS) for control of the vehicle, wherein correcting includes determining a corrected position based on the pseudorange rate measurement. The method also includes controlling, by the device, navigation of the vehicle based on the corrected position.

In one embodiment, performing a Doppler frequency measurement includes performing an extended Kalman filter (EKF)-based operation for simultaneous tracking and navigation of a LEO satellite for LEO satellite position and velocity determination.

In one embodiment, performing a Doppler frequency measurement includes performing a carrier phase measurement of received LEO satellite downlink transmissions, and wherein correcting position data includes correcting a ground truth position of the vehicle.

In one embodiment, the pseudorange rate measurement represents rate of change of distance between the vehicle and an LEO satellite, and wherein a LEO satellite propagation model is employed to determine LEO satellite position and velocity.

In one embodiment, clock states of the vehicle and LEO satellites are propagated using a double integrator model driven by process noise.

In one embodiment, correcting position data of the vehicle includes fusing the corrected position with a vehicle orientation, position, and velocity determined by an inertial measurement unit of the inertial navigation system.

In one embodiment, a simplified general perturbation model including analytical expressions to propagate a satellite position from an epoch time to a specified future time is employed to determine satellite position and velocity for determination of vehicle position.

In one embodiment, a two-body model including expressions of the satellite acceleration and a standard gravitational parameter are employed to determine satellite position and velocity for determination of vehicle position.

In one embodiment, a two-body model with a zonal coefficient including expressions for non-uniform gravity are employed model to determine satellite position and velocity for determination of vehicle position.

In one embodiment, controlling navigation based on the corrected position is performed during a period when GNSS signals are determined as unavailable for determining position of the vehicle.

Another embodiment is directed to a device configured for navigation using low-earth orbit satellite (LEO) signals. The device includes a communications module configured to receive one or more low earth orbit (LEO) satellite signals, and a controller, coupled to the communications module. The controller is configured to receive a low-earth orbit (LEO) satellite downlink transmission, and perform a Doppler frequency measurement on received satellite downlink transmissions to determine a pseudorange rate measurement for a vehicle relative to at least one LEO satellite. The controller is also configured to correct position data of a vehicle inertial navigation system (INS) for control of the vehicle, wherein correcting includes determining a corrected position based on the pseudorange rate measurement. The controller is configured to control navigation of the vehicle based on the corrected position.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1A:
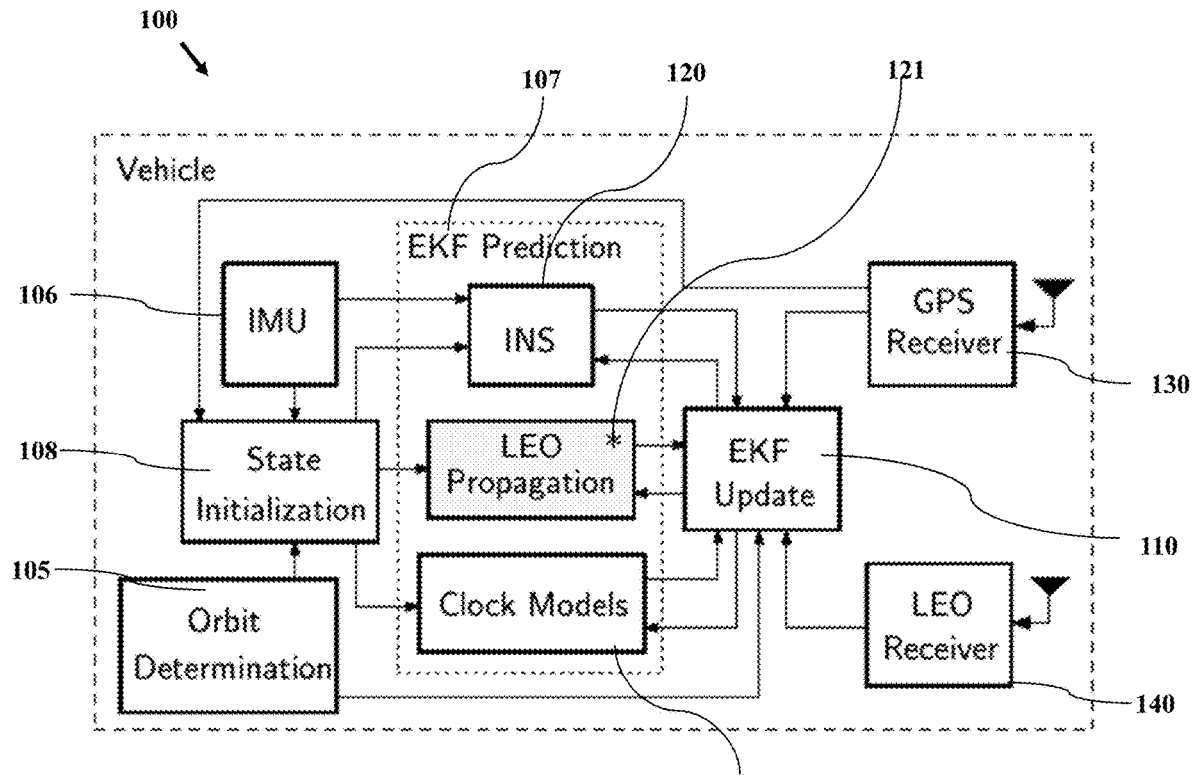
FIG. 1A is a flow chart depicting an exemplary embodiment of a framework for simultaneous LEO satellite tracking and navigation.

One aspect of the disclosure is directed to providing a framework using pseudorange measurements and Doppler measurements from low Earth orbit satellites to determine a receiver's position. Embodiments provide a navigation solution when GNSS signals become unreliable or unavailable.

LEO satellites are particularly attractive aiding sources for a vehicle's INS in GNSS-challenged environments for several reasons. LEO satellites provide an abundance of transmitted signals that are: (i) diverse in direction, which yields a low geometric dilution of precision (GDOP); (ii) centered at various frequencies, which provides independent sources of information that can be used to detect a spoofing attack; and (iii) transmitted from around twenty times closer to the Earth compared to GNSS satellite signals that are transmitted from medium Earth orbit (MEO), making them received 300 to 2400 times more powerful than GNSS signals.

To exploit LEO satellite signals for navigation, their states (positions and clock errors) must be known. LEO satellites have been exploited as sources of navigation when their states were assumed to be known. However, unlike GNSS satellites that periodically transmit accurate information about their positions and clock errors, such information about LEO satellites' states may be unavailable, in which case they must be estimated along with the vehicles' states (orientation, position, velocity, inertial measurement unit (IMU) biases, and clock errors). This estimation problem may be cast as an extended Kalman filter (EKF)-based simultaneous tracking and navigation (STAN) problem, where signals transmitted from LEO satellites are used to simultaneously track the satellites' and vehicle's states. The STAN problem is similar to the radio simultaneous localization and mapping (SLAM) problem. However, in contrast to radio SLAM, which estimates the static terrestrial SOPs' positions, STAN is more challenging, as one must estimate the dynamic stochastic states corresponding to the LEO satellites' position and velocity.

One or more embodiments are directed to device configurations and processes for simultaneous tracking and navigation (STAN). In one embodiment, an extended Kalman filter (EKF)-based simultaneous tracking and navigation (STAN) strategy is provided. The EKF-based STAN framework requires a dynamics model to propagate the state estimates and corresponding estimation uncertainties of LEO satellites. Compared to a two-body orbit model was used to propagate the LEO satellites' position and velocity states, it is known that the two-body orbit model quickly accumulates error between measurement epochs. This accumulation of position and velocity error degrades the navigation performance. While orbit propagation models have been studied for several decades for long-term orbit propagation, embodiments described herein are directed to orbit models for STAN, which is interested in short-term orbit propagation performance of LEO satellites. Specifically, this disclosure studies and compares three different dynamic models for propagation in the STAN framework: (i) Simplified Generalize Perturbation 4 (SGP4), (ii) two-body, and (iii) two-body with J2. This disclosure provides selection of a model that produces small short-term open-loop propagation errors and remains computationally efficient, so that broadband LEO satellites may be propagated in the STAN framework in real-time.

In one embodiment, a method for simultaneous tracking and navigation using low-earth orbit satellite (LEO) signals is provided. The method can include receiving, by a control unit, LEO signals, and correcting, by the control unit, a vehicle intertial navigation system (INS) for control of the vehicle. Position and clock states of LEO satellite signals may be corrected, and extended Kalman filter (EKF)-based simultaneous tracking and navigation (STAN) framework uses LEO satellite propagation model to propagate LEO satellite position and velocity. In one embodiment, the control unit controls navigation of the UAV using the STAN framework and corrected LEO signals. The framework and method may be employed by a system and devices for correcting a position produced by an inertial navigation system when global navigation satellite system signals are unavailable or otherwise undesirable to use.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination.

Therefore, "A, B or C" means "any of the following: A; B; C; A and B; A and C; B and C; A, B and C". An exception to this definition will occur only when a combination of elements, functions, steps or acts are in some way inherently mutually exclusive.

As used herein, the term "pseudorange" refers to values calculated by a receiver representing the time a signal has taken to travel from a satellite to a receiver. Pseudorange is modeled as the true range between the satellite and receiver plus the speed of light times the difference of the receiver's and satellite's clock biases.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

I. STAN Framework

FIG. 1A is a flow chart depicting an exemplary embodiment of a framework 100 for simultaneous LEO satellite tracking and navigation. According to one embodiment, framework 100 provides one or more operations and/or modules that may be employed by a device, such as a vehicle, unmanned aerial vehicle, or device in general to determine position and/or allow for navigation using one or more LEO satellite transmissions received as downlink channels. Framework 100 is shown in FIG. 1 as relating to a vehicle, however it should be appreciated that framework 100 may be employed in one or more types of devices, including components of vehicles and for positioning in general.

According to one embodiment, an extended Kalman filter (EKF) 110 is employed to aid the inertial navigation system (INS) 120 with LEO pseudorange rates and GNSS pseudoranges. The EKF 110 may also use GNSS pseudoranges collected by a GPS receiver 130 and LEO satellite position and velocity information collected by an LEO receiver 140. LEO receiver inertial navigation system (INS) 120 may be configured to receive one or more downlink signals transmitted from one or more LEO satellites.

According to one embodiment, framework 100 can include an orbit determination module 105 to provide one or more operations to provide orbit data for one or more LEO satellites. Orbit determination module 105 may provide two-line element (TLE) files characterizing satellite data to determine position. State initialization module 108 may relate to operations of a controller or control unit of a device configured to determine when global position data sources, such as data received by GPS receiver 130 is not available. Orbit determination module 108 may output to state initialization module 108 navigation based on LEO satellite data. In certain embodiments, state initialization module 108 may also receive data from Inertial measurement unit 106 configured to provide one or more physical measurement outputs (e.g., acceleration, velocity, altitude, etc.) to allow for navigation of a vehicle, including unmanned aerial vehicles. Inertial measurement unit 106 may provide output to inertial navigation system (INS) 120. According to one embodiment, framework 100 includes a LEO propagation module 121 which may employ one or more propagation models, such as propagation models 150 of FIG. 1B. Clock models module 122 may be configured to provide one or more modeled clock shifts and/or clock delays to EFF 110 with respect to carrier frequency of downlink channels.

According to one embodiment, framework 100 can operate based on a GNSS-aided INS with two main differences: (i) the position and clock states of the LEO satellites are unknown to the receiver; hence, they are estimated along with the states of the navigating vehicle and (ii) Doppler measurements are used to aid the INS instead of GNSS pseudoranges. Framework 100 may be an EKF-based STAN framework that requires a LEO satellite propagation model to propagate the LEO satellites' position and velocity and their corresponding estimation uncertainties between measurement epochs. This disclosure discusses solutions and compares the LEO propagation models listed in FIG. 1B for use in a STAN framework. Embodiments are provided to determine a state vector to be estimated.

According to one embodiment, 140 may be employed by a device for one or more pseudorange determinations. As discussed herein, pseudorange determinations can relate to approximations of the distance between a satellite, such as an LEO satellite, and receiver. Receiver configurations may employ measure ranges for a plurality of satellites. Satellite orbital parameters provided by orbit determination module 105 can allow for positions calculation. Pseudoranges of each satellite may be based on the transmission speed (e.g., speed of light), for example, multiplying the speed of light by the time the signal has taken from the satellite to the receiver. As discussed herein, pseudorange may relate to one or more estimates relied on or accuracy errors in the time measured.

Figure 2:
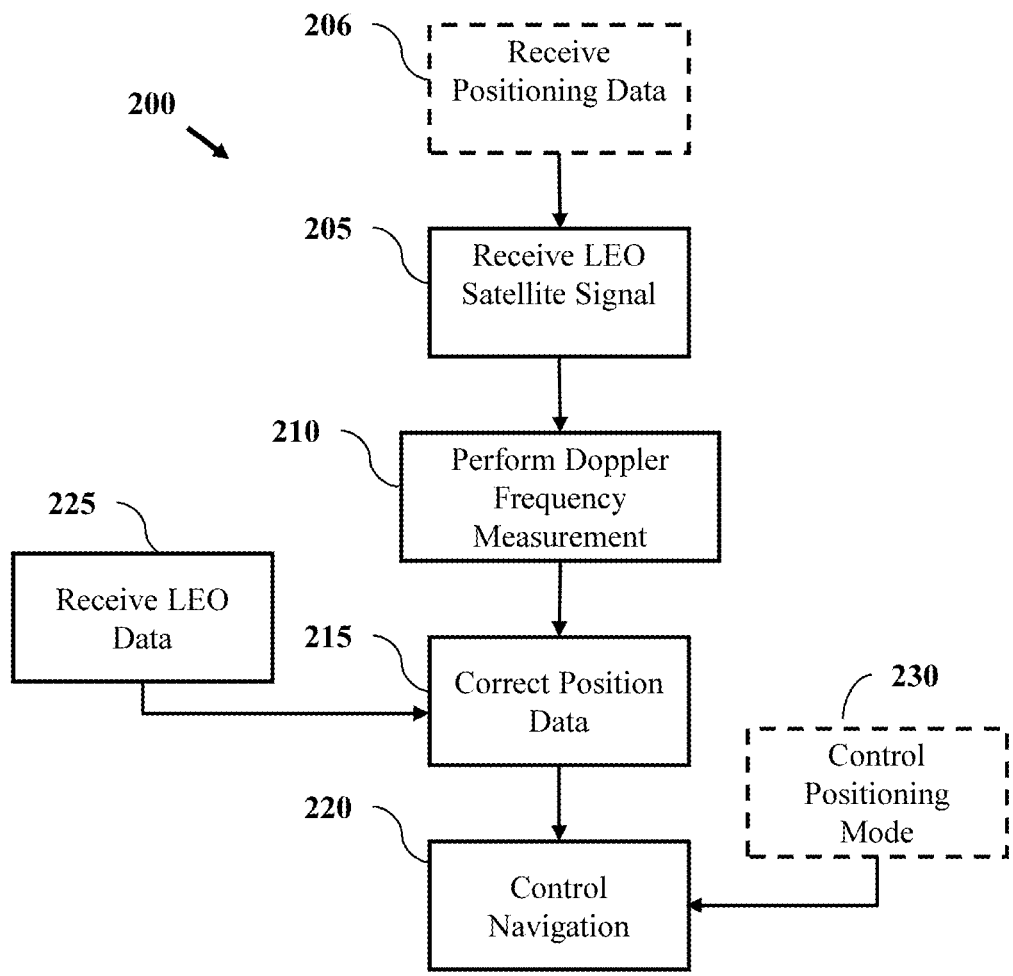
FIG. 2 illustrates a process for simultaneous tracking and navigation using low-earth orbit satellite (LEO) signals according to one or more embodiments.

FIG. 2 illustrates a process for controlling navigation using low Earth orbit (LEO) satellite signals according to one or more embodiments. According to one embodiment, process 200 may be performed by a device, such as the vehicle in framework 100.

Process 200 may be initiated by a receiver (e.g., LEO receiver 140) detecting one or more transmissions from LEO satellites at block 205, such as a satellite downlink transmission. The receiver may be configured to listen for one or more satellite signals. In one embodiment, signals detected by the receiver include direct quadrature phase shift keying (QPSK) signals. QPSK signals are digitally modulated and typically transmit two bits per symbol. As discussed herein, the QPSK signals, received from satellites, as well as satellite data can be used to determine a receiver's position.

At block 210, process 200 includes a Doppler frequency measurement for each downlink channel received. In one embodiment, a Doppler frequency measurement is performed by a Doppler shift measurement of the received downlink signal and Doppler frequency estimate to determine clock drift of the receiver. The Doppler frequency may be used to provide a position estimation of a device based on pseudorange rate data determined. The Doppler frequency measurement on received satellite downlink transmissions can determine a pseudorange rate measurement for a vehicle relative to at least one LEO satellite. In certain embodiments, performing vehicle position estimation includes performing an extended Kalman filter (EKF)-based operation for simultaneous tracking and navigation of a LEO satellite for LEO satellite position and velocity determination. With reference to framework 100 of FIG. 1A, EKF 110 may be configured to track LEO satellite position while a vehicle is in motion to provide one or more corrective date points for correcting a vehicles INS 120.

At block 215, position data determined based on the Doppler frequency measurement may be employed to correct position data of a vehicle inertial navigation system (INS) for control of the vehicle. Correcting at block 215 can include determining a corrected position based on the pseudorange rate measurement. Clock states of the vehicle and LEO satellites may be propagated using a double integrator model driven by process noise.

According to one embodiment, correcting position data of the vehicle includes fusing the corrected position with a vehicle orientation, position, and velocity determined by an inertial measurement unit of the inertial navigation system. Corrections may be fused based on one or more models for determining satellite position and velocity. According to one embodiment, a simplified general perturbation model (e.g., SPG4 model) including analytical expressions to propagate a satellite position from an epoch time to a specified future time is employed to determine satellite position and velocity for determination of vehicle position. In another embodiment, a two-body model including expressions of the satellite acceleration and a standard gravitational parameter are employed to determine satellite position and velocity for determination of vehicle position. In yet another embodiment, a two-body model with a zonal coefficient including expressions for non-uniform gravity are employed model to determine satellite position and velocity for determination of vehicle position.

At block 220, process 200 includes controlling navigation of the vehicle based on the corrected position. Controlling navigation based on the corrected position may be performed during a period when GNSS signals are determined as unavailable for determining position of the vehicle. Pseudorange rate measurements determined based on LEO signals may aid INS 120.

In certain embodiments, LEO satellite data describing satellite position and velocity may be received at block 225. Satellite data received may assist in determining vehicle position when the LEO satellite data is not known, a priori. At block 230, process 200 may include controlling position mode. By way of example, process 200 may revert to a GNSS position determination once signal and/or GNSS services are available.

Figure 3:
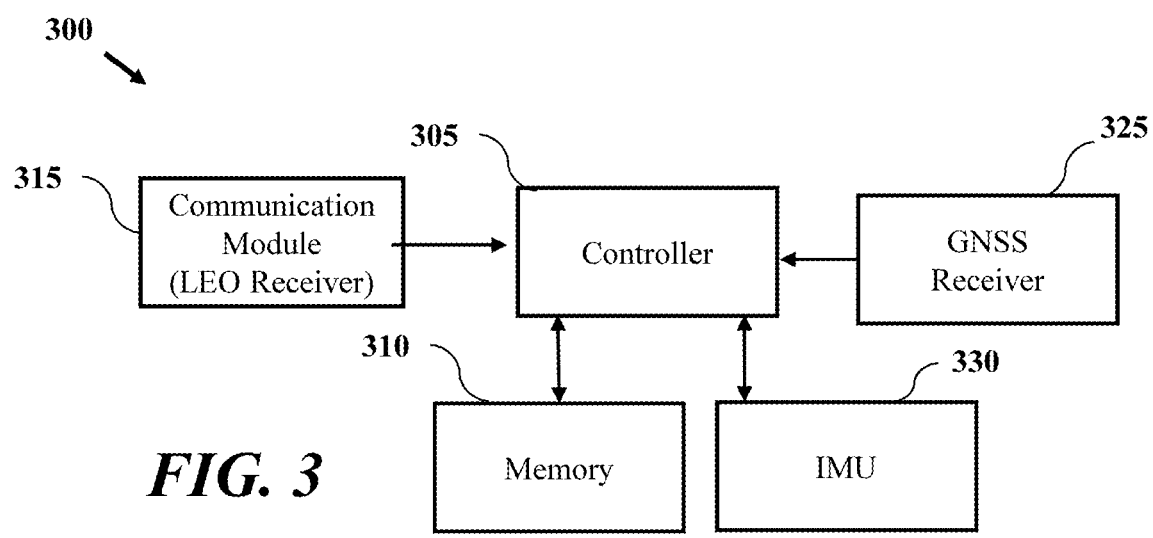
FIG. 3 depicts a device configuration according to one or more embodiments.

FIG. 3 depicts a device configuration according to one or more embodiments. Device 300 may relate to a receiver or components of a vehicle configured to detect LEO satellite transmissions. According to one embodiment, device 300 includes controller 305, memory 310 and communications module 315. Device 300 may also include a GNSS receiver 325 and inertial measurement unit 330. In certain embodiments, GNSS receiver 325 may be optional.

Controller 305 may relate to a processor or control device configured to execute one or more operations stored in memory 310, such as a framework simultaneous tracking and navigation based on measurement of low Earth orbit (LEO) satellite signals. Controller 305 may be coupled to memory 310 and communication module 315. Communications module 315 may be configured to receive one or more low earth orbit (LEO) satellite signals, including direct quadrature phase shift keying (QPSK) signals. Controller 305 may be configured to perform a Doppler frequency measurement for the quadrature phase shift keying (QPSK) signals for each downlink channel received and perform a navigation filter operation to determine clock drift based on each Doppler shift measurement from each channel tracking loop. According to one embodiment, controller 305 is configured to determine a position of the device based on clock drift determined by the navigation filter operation and tracking data for each LEO satellite signal source. Tracking data for each LEO satellite source may be received by communications module 315 by way of wireless communication.

According to one embodiment, controller 305 may be configured to perform a Doppler frequency measurement on received satellite downlink transmissions to determine a pseudorange rate measurement for a vehicle relative to at least one LEO satellite. In the absences of GNSS data, or when GNSS data services are not available, controller 305 may be configured to correct position data of a vehicle inertial navigation system (INS) for control of the vehicle. Controller 305 may perform one or more operations discussed relative to process 200 of FIG. 2. In certain embodiments, controller 305 may be configured to determine a corrected position based on the pseudorange measurement and control navigation of the vehicle based on the corrected position.

Figure 4A:
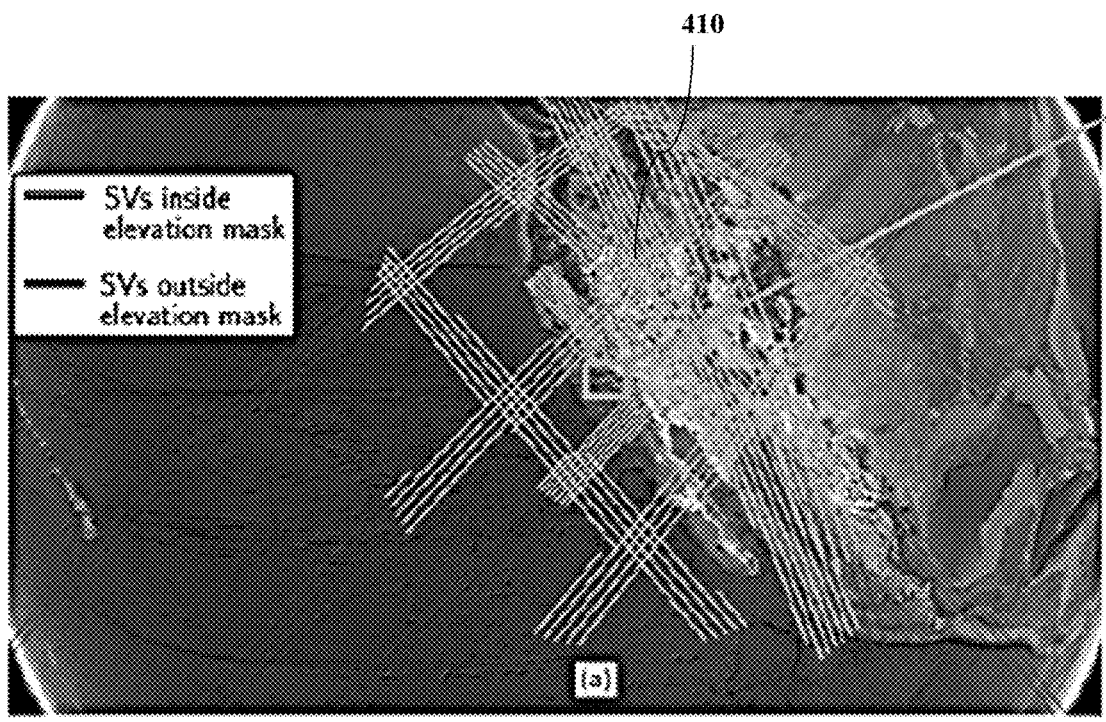
FIG. 4A illustrates simulated orbital trajectories of a plurality of LEO satellites according to one or more embodiments.
Figure 4B:
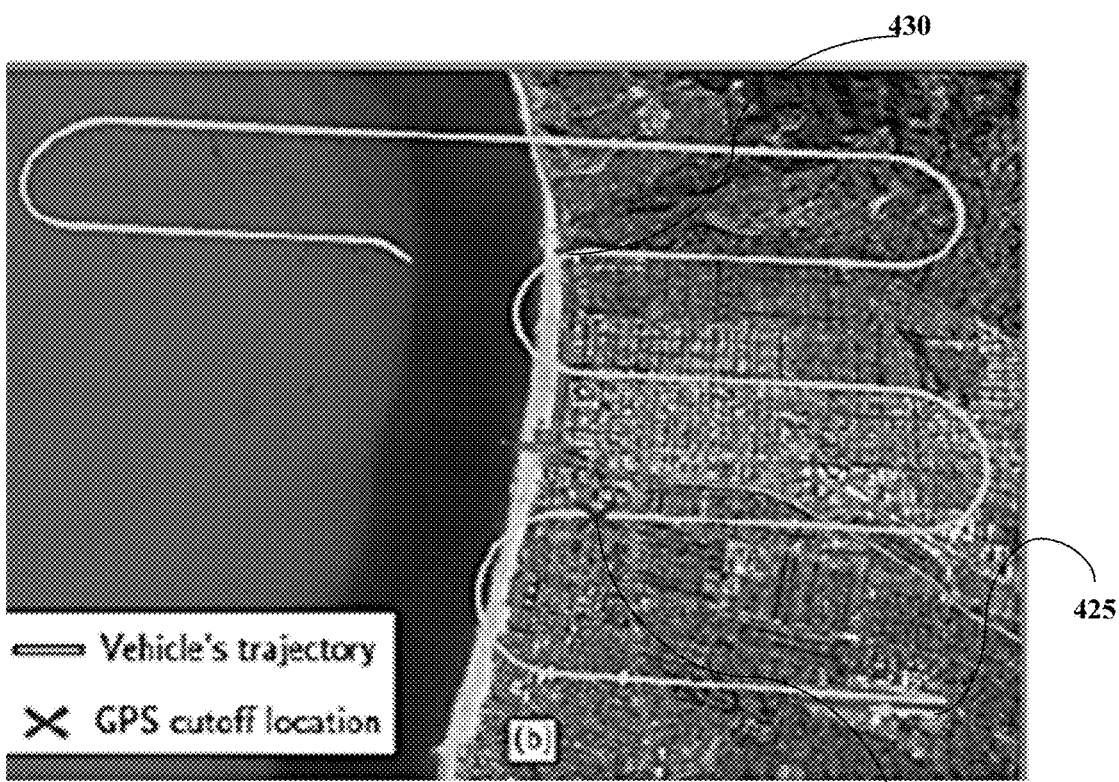
FIG. 4B depicts simulated trajectory of a vehicle and a GPS cutoff location according to one or more embodiments.

FIG. 4A illustrates simulated orbital trajectories of a plurality of LEO satellites according to one or more embodiments. In FIG. 4A, simulated orbital trajectories 410 are shown for a plurality of LEO satellites. FIG. 4B is a simulated orbital image depicting the simulated trajectory of a vehicle 420 (with start point 425) and a GPS cutoff location 430. The satellite orbits 410 and the vehicle's trajectory 420 of a simulated embodiment are illustrated in FIG. 4A and FIG. 4B respectively. The results of a simulated embodiment demonstrate the performance of the proposed framework compared to a traditional GNSS-aided INS both with and without GNSS signals. In principal, a framework of the disclosure (e.g., framework 100) may operate using any constellation from which Doppler and/or pseudoranges are drawn from their transmitted signals. In this simulated embodiment, the Globalstar, Orbcomm, and Starlink satellite constellations are used. Globalstar and Orbcomm satellite orbits are simulated using TLE files and the SGP4 propagation model, according to one embodiment. In one embodiment, Starlink orbits are simulated using TLE files that were created using Keplerian elements and expected perturbation coefficients that are publicly available. These files were sent to the SGP4 propagation model in one embodiment. The portion of the satellite trajectories 410 inside the elevation mask shows at which point the satellites' transmitted signals are available to a navigating vehicle in the simulated embodiment.

In one embodiment, a vehicle trajectory 420 corresponding to an unmanned aerial vehicle (UAV) is simulated. In the simulated embodiment, IMU measurements were generated which corresponded to the vehicle's trajectory 420. In the simulated embodiment, pseudoranges and Doppler measurements to the LEO satellites are simulated, then fed to the STAN framework 100 to simultaneously track the LEO satellites' orbits 410 and aid a vehicle's INS. GPS pseudoranges were set to be available up until the vehicle reaches the GPS cutoff location 430 in FIG. 4B.

Figure 5:
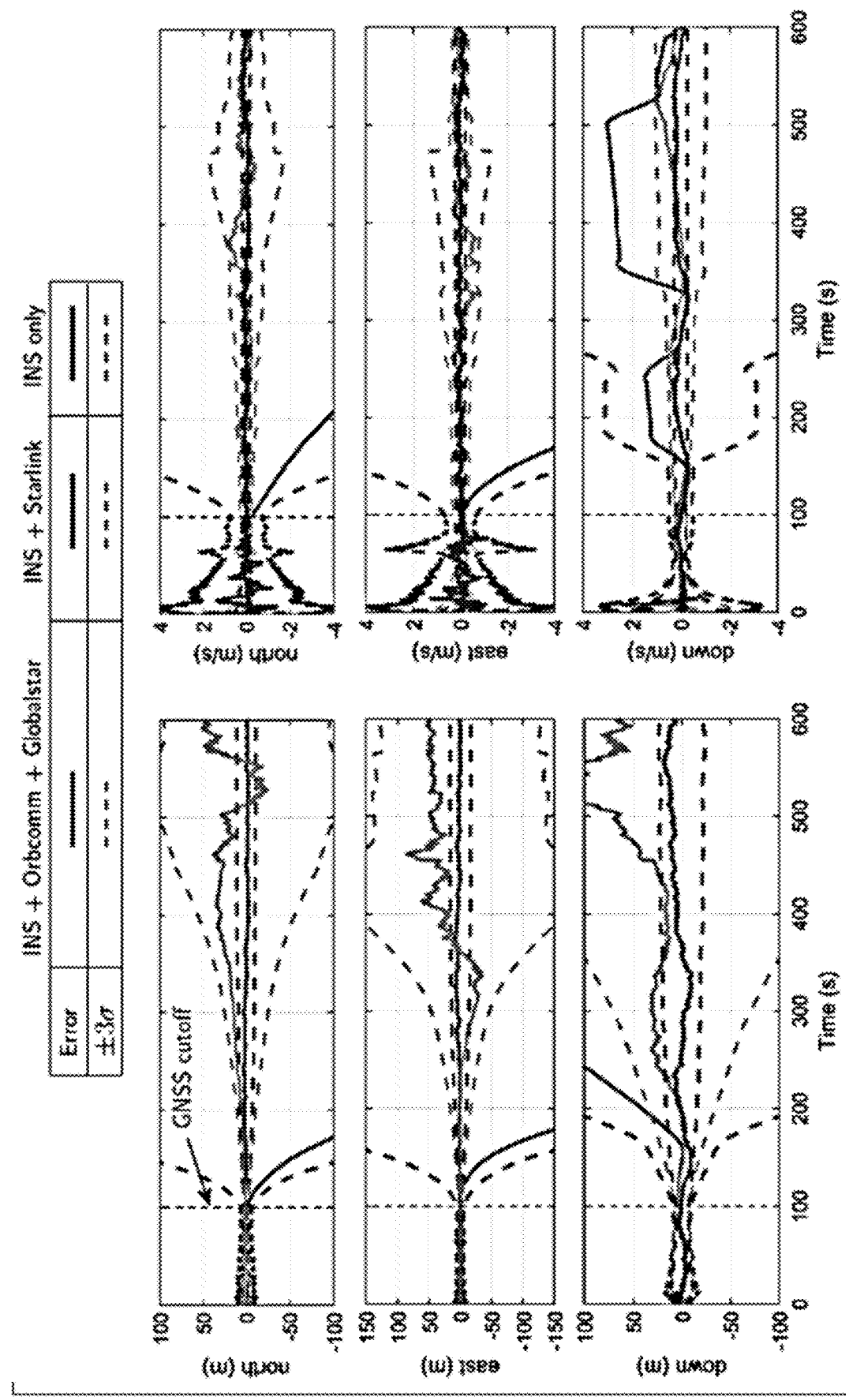
FIG. 5 illustrates EKF estimation error graphs and corresponding plus and minus three standard deviation bounds according to one or more embodiments.

FIG. 5 illustrates EKF estimation error graphs and corresponding plus and minus three standard deviation bounds according to one or more embodiments. The resulting estimation errors and three standard deviation bounds of the navigation vehicle's position are plotted in FIG. 5 for using INS+Orbcomm+Globalstar, INS+Starlink, and INS only. Note that the INS only solution quickly diverges away, while the INS+Orbcomm+Globalstar significantly reduces the error over the INS only and the INS+Starlink appears to bound the errors. The superior performance of the INS+Starlink in one embodiment is due to the large number of Starlink satellites available to the navigating receiver.

Figure 6:
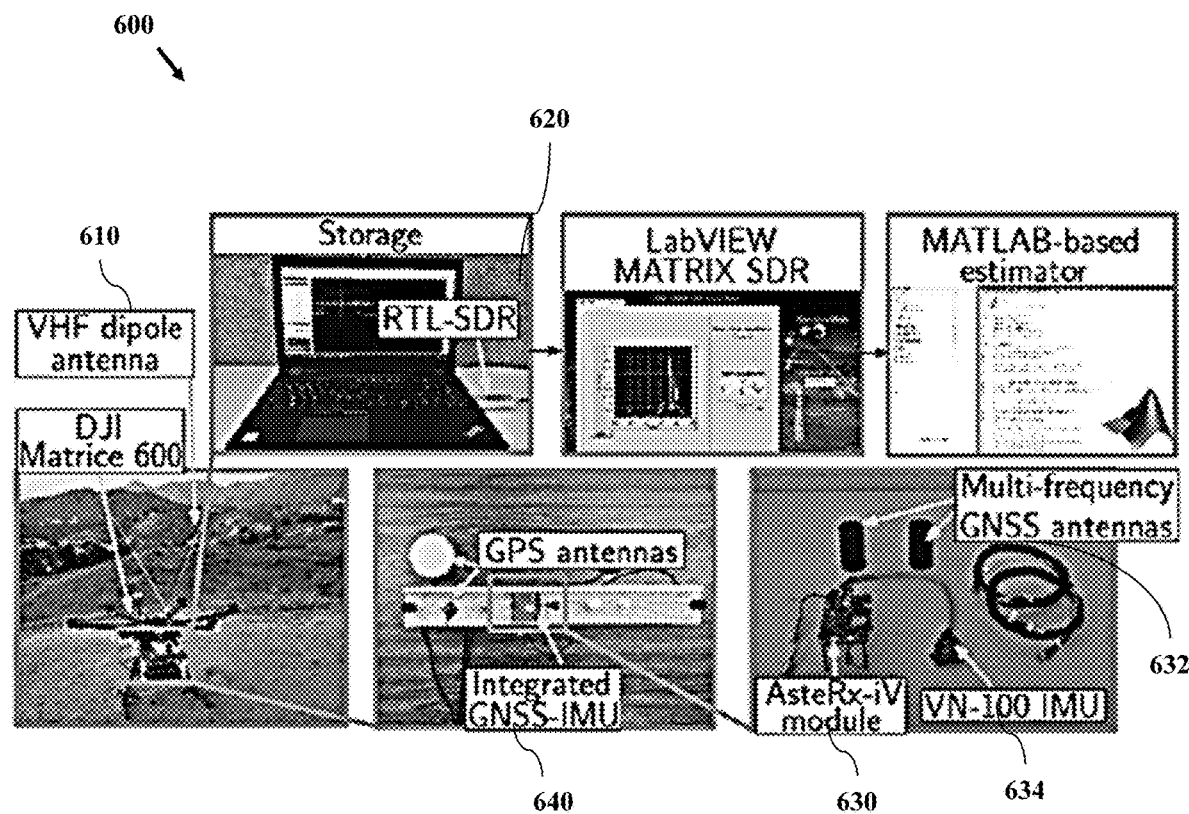
FIG. 6 illustrates an exemplary unmanned aerial vehicle (UAV) experimental hardware setup according to one or more embodiments.

FIG. 6 illustrates an exemplary unmanned aerial vehicle (UAV) 600 experimental hardware setup according to one or more embodiments. The LEO signal-aided INS framework 100 is demonstrated in one embodiment using a UAV 600 and signals from Orbcomm LEO satellite vehicles.

In one embodiment, the UAV 600 is equipped with one or more of the following components: a VHF dipole antenna 610 to receive the Orbcomm satellite downlink signals, which are transmitted at frequencies between 137 and 138 MHz; an RTL dongle 620 to sample Orbcomm symmetric differential phase shift keying (SDPSK) signals; and a Septentrio AsteRx-i V integrated GNSS-IMU 630, which is equipped with a dual-antenna, multi-frequency GNSS receiver 632 and a Vectornav VN-100 micro-electromechanical system (MEMS) IMU 634. In an experimental embodiment, Septentrio's post-processing software development kit (PP-SDK) was used to process GPS carrier phase observables collected by the AsteRx-i V 630 and by a nearby differential GPS base station to obtain a carrier phase-based navigation solution. In an experimental embodiment, an integrated GNSS-IMU real-time kinematic (RTK) system 640 was used to produce the ground truth results with which the proposed navigation framework 100 was compared.

According to one embodiment, the samples collected by the RTL dongle 620 are processed by the Multi-channel Adaptive TRansceiver Information eXtractor (MATRIX) software-defined radio developed by the Autonomous Systems Perception, Intelligence, and Navigation (ASPIN) Laboratory to perform carrier synchronization and extract pseudorange rate observables.

Figure 7:
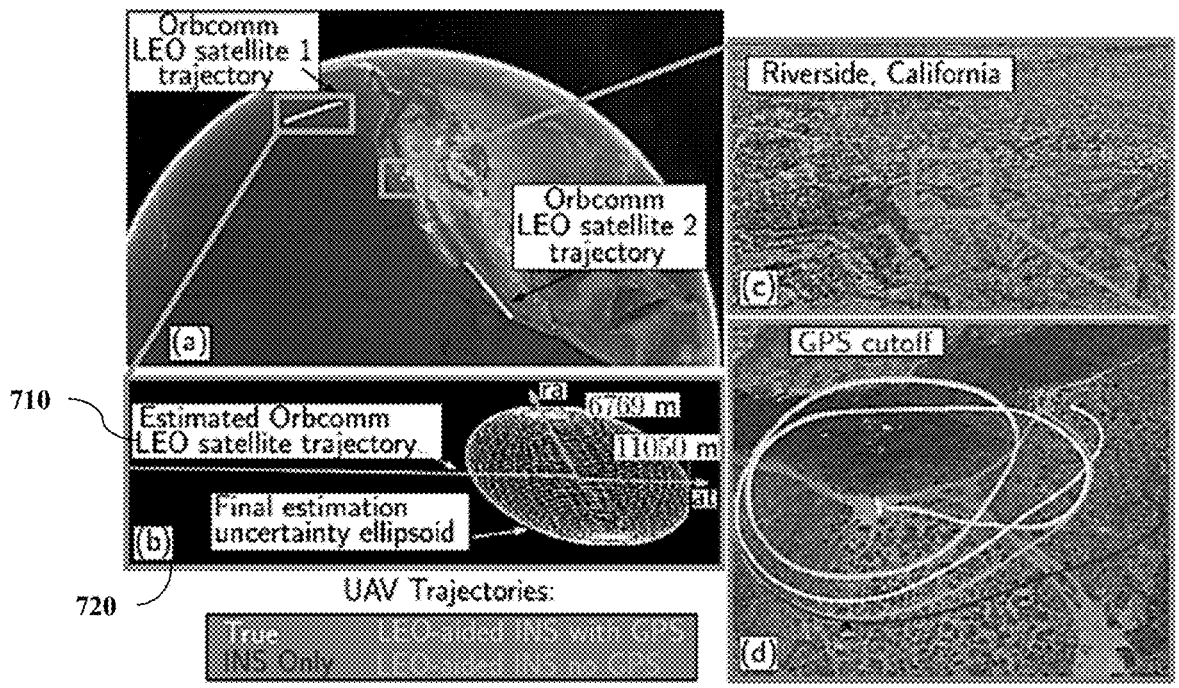
FIG. 7 illustrates orbital images depicting an exemplary set of UAV experimental results according to one or more embodiments.

FIG. 7 illustrates orbital images depicting an exemplary set of UAV experimental results according to one or more embodiments. According to an exemplary set of UAV experimental results, the UAV flew a commanded trajectory over a 120-second period during which 2 Orbcomm LEO satellites were available. Two estimators were implemented to estimate the flown trajectories: (i) the LEO signal-aided INS STAN framework 100 and (ii) a traditional GPS-aided INS for comparative analysis. Each estimator had access to GPS for only the first 90 seconds of the run. In the experimental embodiment, the 3-D position root mean squared error (RMSE) of the traditional GPS-aided INS's navigation solution after GPS became unavailable was 14.4 meters with a final error of 31.7 meters. The 3-D position RMSE of the trajectory of the UAV 600 for the LEO signal-aided INS was 6.8 meters with a final error of 8.8 meters. The results as well as the estimated satellite trajectory 710 and the along-track, radial, cross-track 95th-percentile final uncertainty ellipsoid 720 of one of the satellite's position states are illustrated in FIG. 7.

Figure 8:
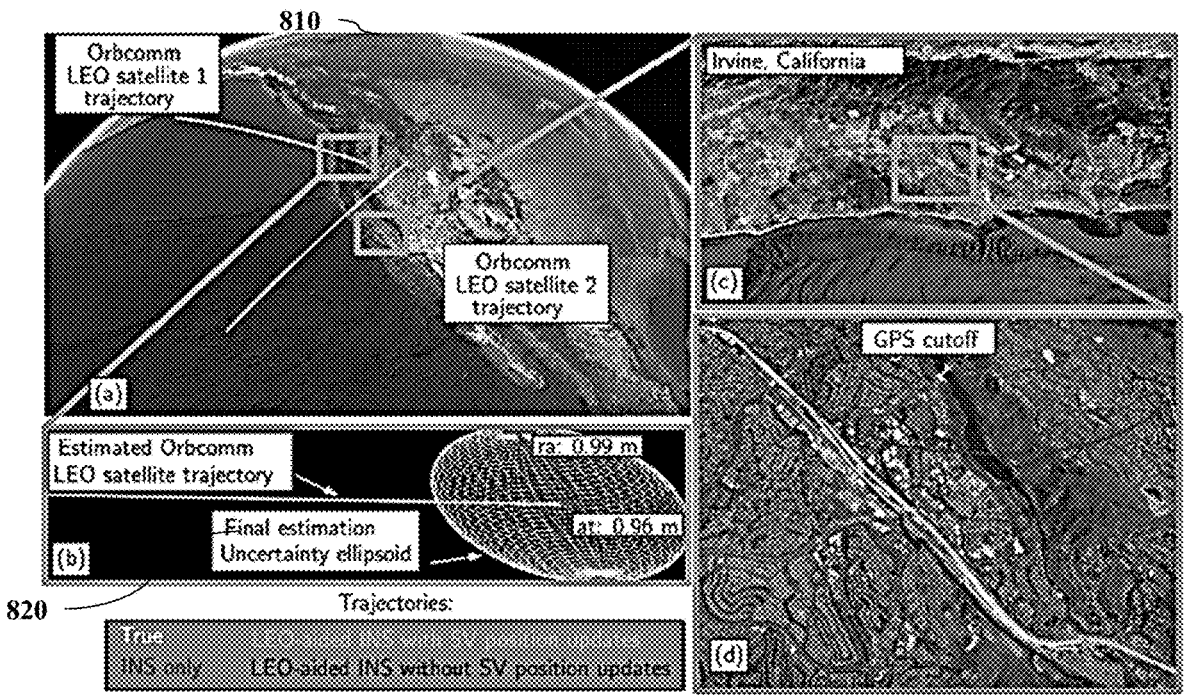
FIG. 8 illustrates a series of marked orbital images depicting an exemplary set of UAV experimental results according to one or more embodiments.

FIG. 8 illustrates a series of marked orbital images depicting an exemplary set of UAV experimental results according to one or more embodiments. In an experimental embodiment, a ground vehicle demonstration was also conducted to show the benefit of incorporating satellite position information. The ground vehicle was driven along U.S. Interstate 5 near Irvine, Calif. for 7,495 km over 258 seconds, during which 2 Orbcomm LEO satellites were available.

In the experimental embodiment, three navigation frameworks were implemented to estimate the vehicle's trajectory: (i) the proposed LEO signal-aided INS STAN framework 100 with satellite vehicle position measurements fed to the EKF, (ii) the proposed LEO signal-aided INS STAN framework 100 without satellite vehicle position measurements fed to the EKF, (iii) a traditional GPS-aided INS for comparative analysis. Each framework had access to GPS for only the first 30 seconds of the run. Trajectory is shown for 2 Orbcomm LEO satellites traversed over the course of the experiment.

Table 1 summarizes the navigation estimation errors for a plurality of exemplary frameworks. It can be seen from these results that LEO satellite Doppler measurements with and without periodically transmitted satellite vehicle position measurements significantly reduce the estimation errors compared to an INS only. The estimated satellite trajectory 810 and the along-track, radial, and cross-track 99$^{th}$ percentile final uncertainty ellipsoid 810 for Orbcomm satellite 1 are illustrated in FIG. 6B for the case where satellite vehicle position updates were available periodically. It is worth noting that the performance in the experimental results is worse than that in the simulation results due to the significantly lower number of LEO satellite vehicles from which only Doppler measurements were used.

TABLE 1

GROUND VEHICLE NAVIGATION PERFORMANCE

| Performance Measure | INS only | INS + Orbcomm without position updates | INS + Orbcomm with position updates |
| --- | --- | --- | --- |
| RMSE (m) | 1,419 | 195.6 | 188.6 |
| Final Error (m) | 3,729 | 476.3 | 233.3 |

According to one embodiment, a STAN model may be employed to provide a state vector.

State Model

Embodiments described here are directed to a state model. In one embodiment, an EKF state vector is given by:

$$x=[x_r^T, x_{leo_1}^T, \ldots, x_{leo_M}^T]^T, x_r=[^B_G\bar{q}^T, r_r^T, \dot{r}_x^T, b_g^T, b_a^T, c\delta t_r, c\delta t_r]^T, x_{leo_m}=[r_{leo_m}^T, \dot{r}_{leo_m}^T, c\delta t_{leo_m}, c\delta t_{leo_m}]^T$$

where $x_r$ is the state vector of the vehicle-mounted IMU and receiver which consists of $$^B_G q,$$

which is a four-dimensional (4-D) unit quaternion representing the orientation of a body frame B fixed at the IMU with respect to a global frame G, $r_r$ and $\dot{r}_r$ are the three-dimensional (3-D) position and velocity of the IMU, $b_g$ and $b_a$ are 3-D biases of the IMU's gyroscopes and accelerometers, respectively, $\delta t_r$ and $\dot{\delta t_r}$ are the clock bias and drift of the receiver, respectively, and c is the speed of light. The vector $x_{leo_m}$ is composed of the states of the $m^{th}$ LEO satellite: $r_{leo_m}$ and $\dot{r}_{leo_m}$ are the 3-D satellite position and velocity, respectively, $\delta x_{leo_m}$ and $\delta_{leo_m}$ are the satellite's transceiver clock bias and drift, respectively, m=1, M, with M being the total number of LEO satellites visible to the receiver.

The EKF propagates an estimate of the vehicle's orientation, position, and velocity in time using IMU data, which is processed through standard INS kinematic equations. The accelerometer and gyroscope biases are propagated using a velocity random walk model. The clock states of both the vehicle and the LEO satellites are propagated using a double integrator model driven by process noise. The LEO satellite position and velocity propagation models will be discussed and compared in Section III.

LEO Satellite Receiver Doppler Measurement Model

The vehicle-mounted LEO satellite signal receiver makes Doppler frequency measurements $f_D$ on the available LEO satellite signals, from which a pseudorange rate measurement $\dot{\rho}$ can be obtained from $$\dot{\rho} = -\frac{c}{f_c} f_D,$$

where $f_c$ is the carrier frequency. The pseudorange rate measurement $\dot{\rho}_m$ at the $k^{th}$ time-step from the mth LEO satellite is modeled according to $$\dot{\rho}_m(k) = \left[\dot{r}_{leo_m}(k) - \dot{r}_r(k)\right]^T \frac{\left[r_r(k) - r_{leo_m}(k)\right]}{\|r_r(k) - r_{leo_m}(k)\|_2} + c \cdot \left[\dot{\delta t}_r(k) - \dot{\delta t}_{leo_m}(k)\right] + c\dot{\delta t}_{iono_m}(k) + c\dot{\delta t}_{trop_m}(k) + v_{\dot{\rho}_m}(k),$$

where $\dot{\delta t}_{iono_m}$ and $\dot{\delta t}_{trop_m}$ are the drifts of the ionospheric and tropospheric delays, respectively, for the $m^{th}$ LEO satellite and $v_{\dot{\rho}_m}$ is the measurement noise, which is modeled as a white Gaussian random sequence with variance $\sigma_{v_{\dot{\rho},m}}^2$. Note that the variation in the ionospheric and tropospheric delays during LEO satellite visibility is negligible compared to the errors in the satellite's estimated velocities [36]; hence, $\dot{\delta t}_{iono_m}$ and $\dot{\delta t}_{trop_m}$ are ignored in the measurement model, yielding the measurement model given by $$\dot{\rho}_m(k) \approx \left[\dot{r}_{leo_m}(k) - \dot{r}_r(k)\right]^T \frac{\left[r_r(k) - r_{leo_m}(k)\right]}{\|r_r(k) - r_{leo_m}(k)\|_2} + c \cdot \left[\dot{\delta t}_r(k) - \dot{\delta t}_{leo_m}(k)\right] + v_{\dot{\rho}_m}(k). \quad (1)$$

where $$\dot{\delta t}_{iono_m} \text{ and } \dot{\delta t}_{trop_m}$$

are the drifts of the ionospheric and tropospheric delays, respectively, for the mth LEO satellite and $\dot{v}_{\dot{\rho}_m}$ is the measurement noise, which is modeled as a white Gaussian random sequence with variance $$\sigma^2_{\dot{v}_{\dot{\rho}_m}}.$$

Note that the variation in the ionospheric and tropospheric delays during LEO satellite visibility is negligible compared to the errors in the satellites estimated velocities hence, $$\dot{\delta t}_{iono_m} \text{ and } \dot{\delta t}_{trop_m}$$

are ignored in the measurement model, yielding the measurement model given by $$\dot{\rho}_m(k) \approx \left[\dot{r}_{leo_m}(k) - \dot{r}_r(k)\right]^T \frac{\left[r_r(k) - r_{leo_m}(k)\right]}{\|r_r(k) - r_{leo_m}(k)\|_2} + c \cdot \left[\dot{\delta t}_r(k) - \dot{\delta t}_{leo_m}(k)\right] + v_{\dot{\rho}_m}(k).$$

LEO Satellite Dynamic Model Analysis

Figure 1B:
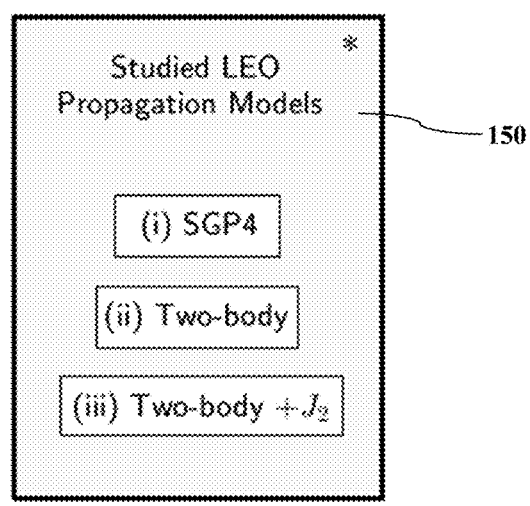
FIG. 1B is a graphical representation of LEO propagation models discussed in the disclosure.

In this section, the three LEO position and velocity propagation models listed in FIG. 1B are analyzed for use in an EKF-based STAN framework. The goal of this analysis is to select a propagation model that (i) produces small position error after several minutes of open-loop propagation, (ii) be implementable in an EKF (analytically linearizable), and (iii) remain computationally efficient so that many LEO satellites can simultaneously be propagated in the STAN framework in real-time.

A. Propagation Model Test Setup

Each propagation model is analyzed by comparing the propagated LEO satellite position and velocity with real GPS-derived position and velocity data, which is transmitted from Orbcomm satellite-mounted GPS receivers every four seconds. The Orbcomm constellation is a wide area two-way communication system that uses a constellation of LEO satellites to provide worldwide geographic coverage for sending and receiving alphanumeric packets. Orbcomm satellites reside in an altitude ranging from 740 km to 975 km. Two different Orbcomm satellites are used over approximately 450 seconds to analyze each propagation model. The SGP4 model is analyzed by computing the error between the GPS receiver's position and velocity and the corresponding position and velocity produced by SGP4. The remaining two models are studied using a Monte Carlo-type analysis according to the following procedure:

1. Collect K Orbcomm LEO satellite-mounted GPS receiver positions $r_{leo}(k)$ and velocities $\dot{r}_{leo}(k)$, where k=1, 2, ..., K, at 4 second intervals from two satellites.
2. Set a counter j≡1.
3. The candidate propagator is initialized using $r_{leo}(j)$ and $\dot{r}_{leo}(j)$. Denote these initial estimates as $\hat{r}_{leo}(j)$ and $\hat{\dot{r}}_{leo}(j)$, respectively.
4. The candidate propagator propagates the position $\hat{r}_{leo}(j)$ and velocity $\hat{\dot{r}}_{leo}(j)$ to $\hat{r}_{leo}(k)$ and $\hat{\dot{r}}_{leo}(k)$, respectively, where k=j+1, j+2, ..., K.
5. The error between the GPS receiver's position and the propagational one is computed according to $\|r_{leo}(k) - \hat{r}_{leo}(k)\|_2$, where k=j+1, j+2, ..., K.
6. Increment j and loop back to step 3 until j=K.

The next two subsections discuss each propagator and summarize the results of the analysis.

SGP4 Propagation

The satellites Keplerian elements and perturbing acceleration parameters are contained in publicly available two-line element (TLE) file sets. The information in these files may be used to initialize the SGP4 model, which is specifically designed to propagate a LEO satellite's orbit. SGP propagators are optimized for speed by replacing complicated perturbing acceleration models that require numerical integrations with analytical expressions to propagate a satellite position from an epoch time to a specified future time. The tradeoff is in satellite position accuracy—the SGP4 propagator has around 3 km in position error at epoch and the propagated orbit will continue to deviate from its true one until the TLE files are updated the following day. The position and velocity error computed according to the procedure discussed in Subsection III-A are plotted in FIG. 9 for satellite 1 and 2.

Figure 9:
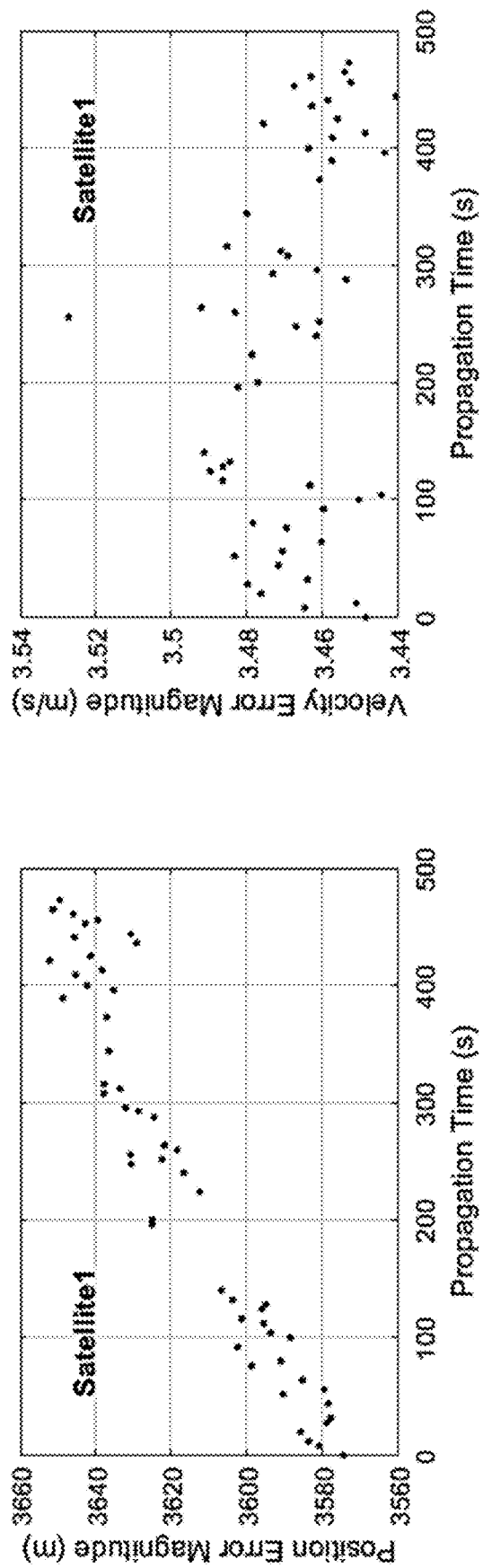
FIG. 9 depicts exemplary SGP4 position and velocity errors for satellites (e.g., satellite 1 and satellite 2) according to one or more embodiments.
Figure 9:
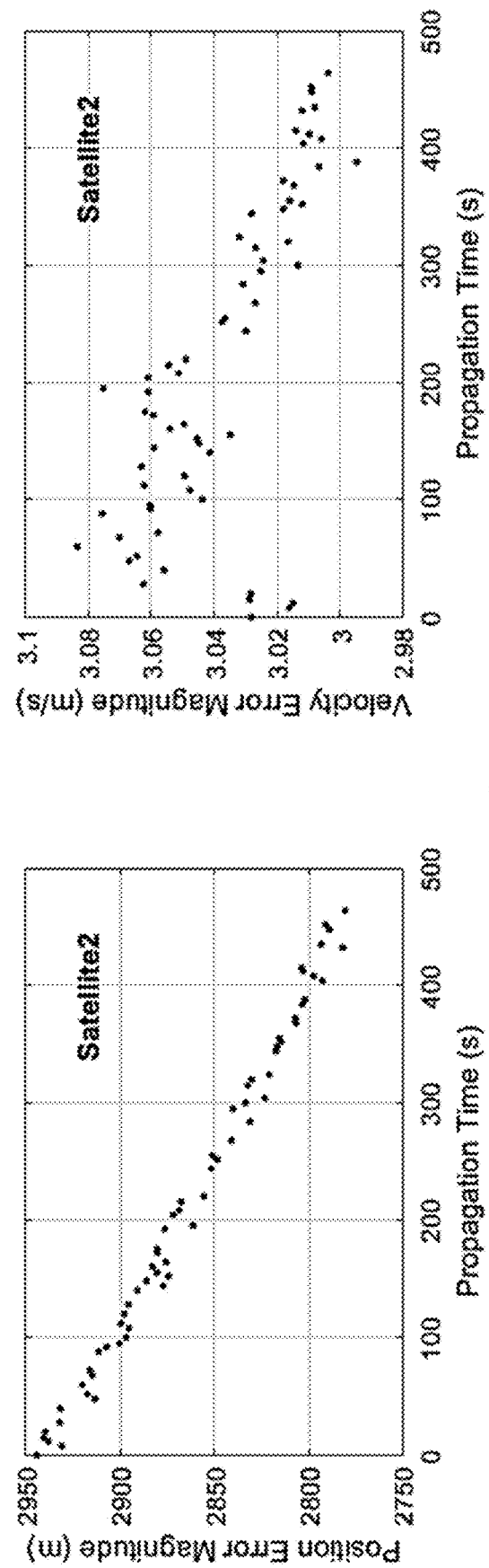

FIG. 9 depicts exemplary SGP4 position and velocity errors for satellites (e.g., satellite 1 and satellite 2) according to one or more embodiments. As shown in FIG. 9, the position error is approximately 3 km at initialization time, as expected. The error for satellite 1 increases by approximately 80 meters after 450 seconds of propagation time. The error for satellite 2 decreases by approximately 80 meters. This decrease is due to the errors being periodic over short periods of time. The errors over longer propagation periods will begin to increase. The SGP4 model is determined to be unsuitable for use in the STAN framework for the following reasons. First, while the increase in error of the SGP4 model over short periods of time would be suitable for use in the STAN framework, the initial error is large. Second, the SGP4 model cannot be initialized with an externally derived position and velocity, i.e., only TLE files can be used for initialization. Third, the propagation algorithm is treated as a "gray box" propagator; therefore, it would be difficult to derive state transition matrices to propagate corresponding LEO satellite position and velocity estimation error covariances.

Two-Body Propagation

The two-body motion equation of the $m^{th}$ LEO satellite is given by $$\ddot{r}_{leo_m} = -\frac{\mu}{\|r_{leo_m}\|_2^3} r_{leo_m} + \tilde{w}_{leo_m},$$

where $$\dot{r}_{leo_m} = \frac{d}{dt} r_{leo_m},$$

i.e., the acceleration of the $m^{th}$ LEO satellite, $\mu$ is the standard gravitational parameter, and $\tilde{w}_{leo_m}$ is process noise, which attempts to capture the overall perturbation in acceleration, which includes non-uniform Earth gravitational field, atmospheric drag, solar radiation pressure, third-body gravitational forces (e.g., gravity of the Moon and Sun), and general relativity. The process noise vector $\tilde{w}_{leo_m}$ is modeled as a white random vector with power spectral density (PSD) $Q_{w_{leo_m}}$.

The two-body model is convenient because it has a known analytical solution; however, the perturbing accelerations are not zero mean, which this model neglects. Omitting these perturbing accelerations can cause hundreds of meters in position error after just a few minutes of open-loop propagation due to the model mismatch. The position error of the two-body propagation model computed according to the procedure discussed in Subsection III-A is plotted in FIG. 10 for satellite 1 and 2.

Figure 10:
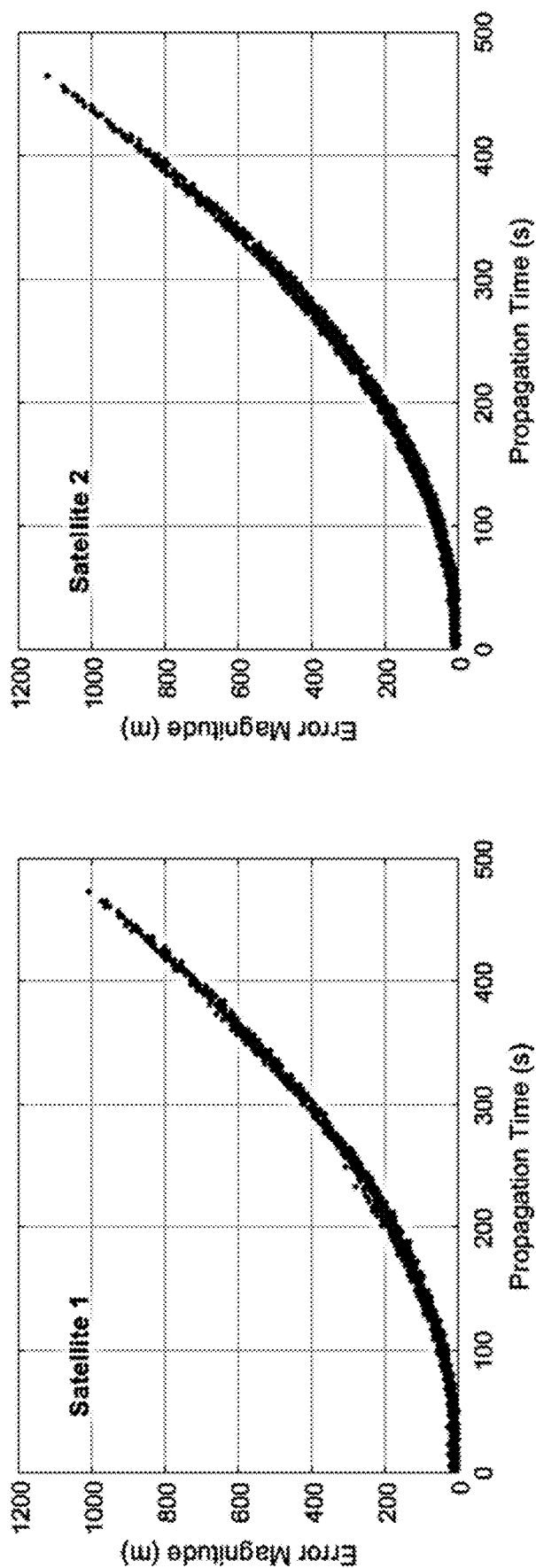
FIG. 10 depicts exemplary two-body positions and velocity errors for satellites (e.g., satellite 1 and satellite 2) according to one or more embodiments.

FIG. 10 depicts exemplary two-body positions and velocity errors for satellites (e.g., satellite 1 and satellite 2) according to one or more embodiments. As shown in FIG. 10, the error magnitude of the position states for satellite 1 and 2 grows much quicker compared to the errors of the SGP4 model. While the two-body model has a known and simple analytical Jacobian for estimation error covariance propagation, the accumulation of position and velocity estimation error is large, especially for large intervals between measurement epochs. Furthermore, since the process noise vector $\tilde{w}_{leo_m}$ is modeled as a white process, which is attempting to capture unmodeled perturbations, the PSD $Q_{\tilde{w}_{leo_m}}$ would have to be selected to over-bound these expected perturbations. This over bounding can cause a model mismatch, which can lead to incorrect propagation of the estimation error covariance, and subsequently cause inconsistent estimation or filter divergence altogether. In what follows, a more sophisticated LEO satellite dynamics model is studied, which aims to significantly reduce estimation errors by including the most significant non-zero mean perturbing acceleration components, while maintaining a simple analytical Jacobian for estimation error covariance propagation.

Two-Body with J2

The most significant perturbing accelerations for a LEO satellite is due to Earth's non-uniform gravity $a_{grav}$. The two-body model with $a_{grav}$ can be written more generally as $$\ddot{r}_{leo_m} = a_{grav_m}, \quad a_{grav_m} = \frac{dU_m}{dr_{leo_m}},$$

where $U_m$ is the non-uniform gravity potential of the Earth.

To model the non-uniform gravity potential of the Earth $U_m$, several models have been developed. For a satellite requiring accuracies of a few meters, the JGM-3 model developed by Goddard Space Flight Center is usually sufficient. In this work, the tesseral and sectoral terms of the JGM-3 model are neglected, since they are several orders of magnitude smaller than the zonal terms (denoted $\{J_n\}_{n=2}^\infty$)). This gives the gravitational potential of the Earth at the $m^{th}$ LEO satellite as $$U_m = \frac{\mu}{\|r_{leo_m}\|} \left[ 1 - \sum_{n=2}^N J_n \frac{R_E^n}{\|r_{leo_m}\|^n} P_n(\sin(\theta)) \right].$$

where $P_n$ is a Legendre polynomial with harmonic n, $J_n$ is the $n^{th}$ zonal coefficient, $R_E$ is the mean radius of the Earth, $\sin(\theta) = z_{leo_m}/\|r_{leo_m}\|$, $r_{leo_m} \triangleq [x_{leo_m}, y_{leo_m}, z_{leo_m}]^T$ are the position coordinates of the $m^{th}$ LEO satellite in an Earth-centered inertial frame, and $N=\infty$. The terms of acceleration corresponding to coefficients $> J_2$ are approximately three orders of magnitude smaller than the ones due to $J_2$. Therefore, the perturbation due to non-uniform gravity will be approximated by using only the term corresponding to $J_2$. Taking the partial derivative of the representation of the gravitation potential of the Earth at the $m^{th}$ LEO satellite with respect to the components of $r_{leo_m}$ with $N=2$ gives the components of $$a_{grav_m} = [\ddot{x}_{grav_m}, \ddot{y}_{grav_m}, \ddot{z}_{grav_m}]^T \text{ to be}$$

$$\ddot{x}_{grav_m} = -\frac{\mu x_{leo_m}}{\|r_{leo_m}\|^3} \left[ 1 + J_2 \frac{3}{2} \left( \frac{R_e}{\|r_{leo_m}\|} \right)^2 \left( 1 - 5 \frac{z_{leo_m}^2}{\|r_{leo_m}\|^2} \right) \right],$$

-continued $$\ddot{y}_{grav_m} = -\frac{\mu y_{leo_m}}{\|r_{leo_m}\|^3}\left[1 + J_2\frac{3}{2}\left(\frac{Re}{\|r_{leo_m}\|}\right)^2\left(1 - 5\frac{z_{leo_m}^2}{\|r_{leo_m}\|^2}\right)\right],$$

$$\ddot{z}_{grav_m} = -\frac{\mu z_{leo_m}}{\|r_{leo_m}\|^3}\left[1 + J_2\frac{3}{2}\left(\frac{Re}{\|r_{leo_m}\|}\right)^2\left(3 - 5\frac{z_{leo_m}^2}{\|r_{leo_m}\|^2}\right)\right].$$

The equations in are substituted into the two model equation above, with the JGM-3 model's dimensionless zonal coefficient J2=1.08262668355×10$^{-2}$, and two Orbcomm LEO satellite positions were propagated. The position error was computed and results are plotted in FIG. 11 for satellite 1 and 2

Figure 11:
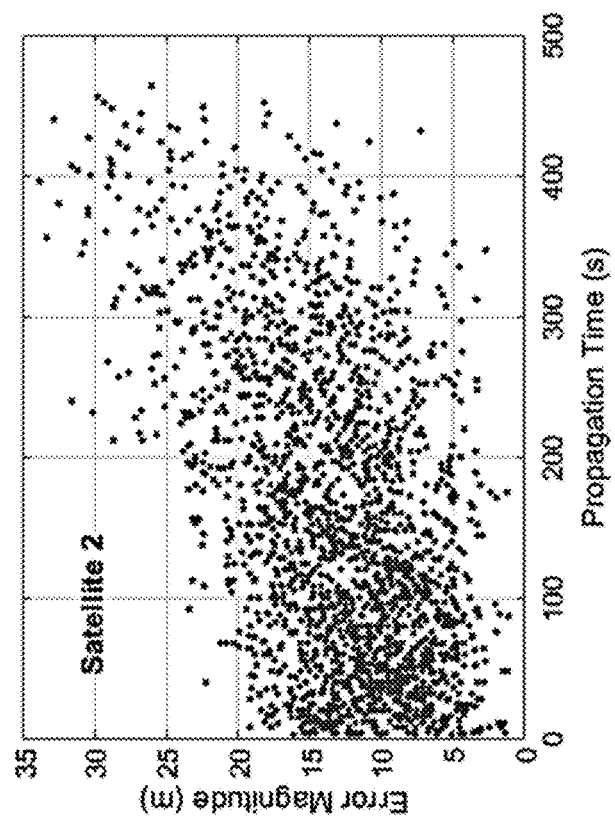
FIG. 11 depicts exemplary two-body with $J_2$ model position errors for satellites (e.g., satellite 1 and satellite 2) according to one or more embodiments.
Figure 11:
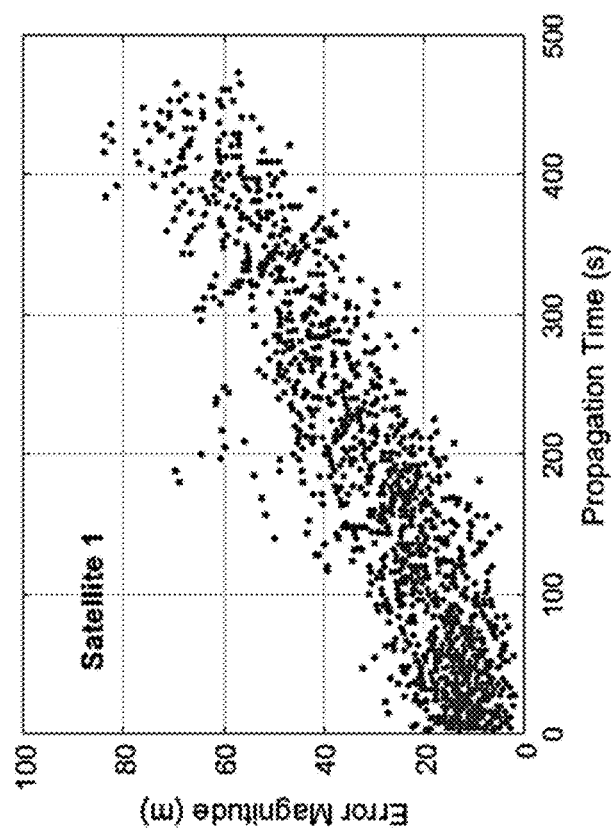

FIG. 11 depicts exemplary two-body with $J_2$ model position errors for satellites (e.g., satellite 1 and satellite 2) according to one or more embodiments. The following may be concluded from the plots in FIG. 11. First, the position error grows significantly slower compared to the two-body only errors in FIG. 10. Second, the growth in error is comparable to that of the SGP4 propagation errors in FIG. 9, however; in contrast to the SGP4 propagator, the two-body with J2 can be initialize using any a priori knowledge of the position and velocity of the satellite. Similar values were noted when this model was used to propagate the orbits of other Orbcomm satellites. Note that this model has desirable error characteristics for use in the STAN framework, and in contrast to the SGP4 propagator, it as has a simple and known analytical expression for the Jacobian of (3). For these reasons, the model (3) is selected as the LEO satellite propagation model for use in the STAN framework.

EXPERIMENTAL RESULTS

In this section, the LEO signal-aided INS framework is demonstrated experimentally on a UAV. The experimental setup is first described and then experimental results are provided.

Experimental Setup

Figure 12:
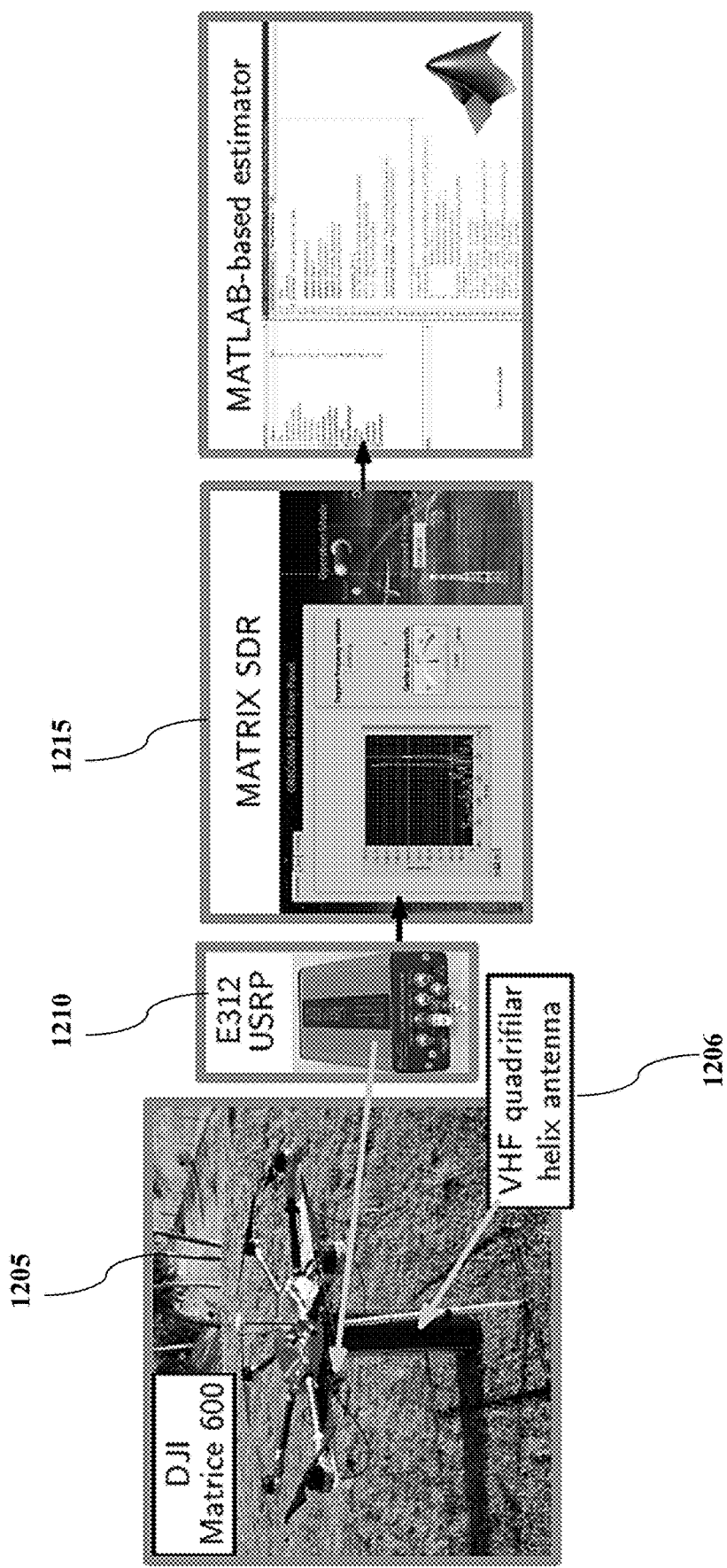
FIG. 12 depicts an exemplary representation of hardware according to one or more embodiments according to one or more embodiments.

FIG. 12 depicts an exemplary representation of hardware according to one or more embodiments according to one or more embodiments. An experimental test was conducted to evaluate the performance of the proposed LEO signal-aided INS framework. To this end, a DJI Matrice 600 UAV 1205 was equipped with following hardware and software:
- a high-end quadrifilar helix antenna 1206;
- an Ettus E312 universal software radio peripheral 1210 to sample Orbcomm signals and store the in-phase and quadrature components. These samples were then processed by the Multi-channel Adaptive TRansceiver Information eXtractor (MATRIX) 1215 software-defined quadrature phase-shift keying (QPSK) receiver developed by the Autonomous Systems Perception, Intelligence, and Navigation (ASPIN) Laboratory to perform carrier synchronization and extract pseudorange rate observables.
- a consumer-grade micro-electromechanical (MEMS) IMU, which is proprietary DJI hardware used in their A3 flight controller. Log files were downloaded from the UAV to parse the raw IMU data, which were subsequently fed to the INS of the STAN framework.
- a pressure altimeter, which is proprietary DJI hardware used in their A3 flight controller. Log files were downloaded from the UAV to parse the altitude measurements, which were subsequently fed to the EKF update of the STAN framework.

the ground truth trajectory was taken from the UAV's onboard navigation system, which consists of a MEMS IMU, a multi-constellation GNSS receiver (GPS and GLONASS), a pressure altimeter, and a magnetometer.

Results

The UAV flew a commanded trajectory in Irvine, Calif., USA, over a 160-second period during which 2 Orbcomm LEO satellites were available. Three estimators were implemented to estimate the flown trajectories: (i) the LEO signal-aided INS STAN framework described in Section II with the two-body model excluding J2 for LEO satellite state propagation, (ii) the LEO signal-aided INS STAN framework described in Section II with the two-body model including J2 for LEO satellite state propagation, and (iii) a traditional GPS-aided INS for comparative analysis. All estimated trajectories were compared with the trajectory taken from the UAV's onboard navigation system.

Figure 13:
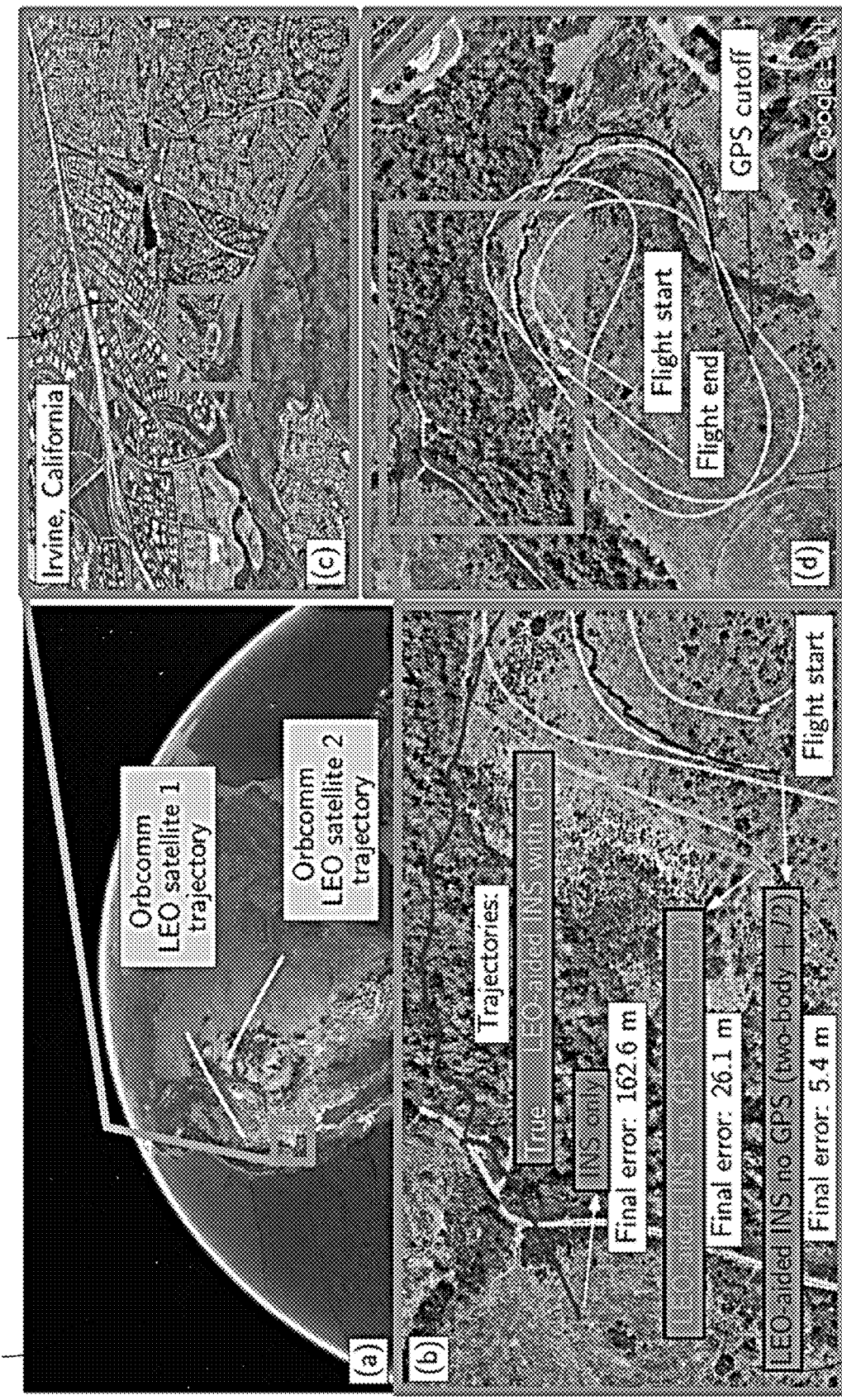
FIG. 13 depicts graphical representations of trajectories according to one or more embodiments.

FIG. 13 depicts graphical representations of trajectories according to one or more embodiments. Trajectories shown in FIG. 13 include experimental results showing (a) the trajectory of the 2 Orbcomm LEO satellites 1305, (b) zoom on the UAV's final position and final position estimates 1306, and (c)(d) true and estimated trajectories of the UAV 1307, 1308.

Each estimator had access to GPS for only the first 125 seconds of the run, after which GPS signals were cut off for the remaining 45 seconds, as illustrated in 1308. The trajectory of the 2 Orbcomm LEO satellites traversed over the course of the experiment is shown in 1305. The position and velocity estimates of these satellites were initialized using position and velocity data that is transmitted down from Orbcomm satellite-mounted GPS receivers. The navigating vehicle's 3-D position root mean-squared error (RMSE) of the traditional GPS-aided INS's navigation solution after GPS was cut off was 73.1 meters with a final error of 162.6 meters. The 3-D position RMSE of the UAV's trajectory for the LEO signal-aided INS with two-body model excluding J2 was 13.4 meters with a final error of 26.1 meters. The 3-D position RMSE of the UAV's trajectory for the LEO signal-aided INS with two-body model including J2 was 5.3 meters with a final error of 5.4 meters. The navigation results are summarized in Table II.

TABLE II

UAV NAVIGATION PERFORMANCE

| Performance Measure | INS only | STAN: two-body | STAN: two-body + $J_2$ |
|---|---|---|---|
| RMSE (m) | 73.1 | 13.4 | 5.3 |
| Final Error (m) | 162.6 | 26.1 | 5.4 |

This disclosure is based on three LEO satellite propagation models studied for use in an EKF-based STAN framework. It was found that a two-body with J2 model provides significantly smaller satellite propagation errors compared to a two-body only model while maintaining a simple analytical expression for the dynamics Jacobian. Experimental results were presented for a UAV navigating for 160 seconds, the last 45 seconds of which were without GNSS signals. Three navigation frameworks were compared: (i) a GNSS-aided inertial navigation system (INS), and a LEO-aided INS STAN with two Orbcomm LEO satellites utilizing the two-body model (ii) without J2 and (iii) with J2. It was shown that the 3-D position RMSE and final position errors with the unaided INS were 73.1 m and 162.6 m, respectively; the 3-D position RMSE and final position errors with the LEO-aided INS STAN without J2 were 13.4 m and 26.1 m, respectively; and 3-D position RMSE and final position errors with the LEO-aided INS STAN with J2 were 5.3 m and 5.4 m, respectively.

While this disclosure has been particularly shown and described with references to exemplary embodiments thereof, it will be understood by those skilled in the art that various changes in form and details may be made therein without departing from the scope of the claimed embodiments.

What is claimed is:

1. A method for navigation using low-earth orbit satellite (LEO) signals, the method comprising:
   receiving, by a device, a low-earth orbit (LEO) satellite downlink transmission;
   performing, by the device, a Doppler frequency measurement on received satellite downlink transmissions to determine a pseudorange rate measurement for a vehicle relative to at least one LEO satellite, wherein a simplified general perturbation model including analytical expressions to propagate a satellite position from an epoch time to a specified future time is employed to determine satellite position and velocity for determination of vehicle position;
   correcting, by the device, position data of a vehicle intertial navigation system (INS) for control of the vehicle, wherein correcting includes determining a corrected position based on the pseudorange rate measurement; and
   controlling, by the device, navigation of the vehicle based on the corrected position.

2. The method of claim 1, wherein performing a Doppler frequency measurement includes performing an extended Kalman filter (EKF)-based operation for simultaneous tracking and navigation of a LEO satellite for LEO satellite position and velocity determination.

3. The method of claim 1, wherein the pseudorange rate measurement represents rate of change of distance between the vehicle and an LEO satellite, and wherein a LEO satellite propagation model is employed to determine LEO satellite position and velocity.

4. The method of claim 1, wherein clock states of the vehicle and LEO satellites are propagated using a double integrator model driven by process noise.

5. The method of claim 1, wherein correcting position data of the vehicle includes fusing the corrected position with a vehicle orientation, position, and velocity determined by an inertial measurement unit of the inertial navigation system.

6. The method of claim 1, wherein a two-body model including expressions of the satellite acceleration and a standard gravitational parameter are employed to determine satellite position and velocity for determination of vehicle position.

7. The method of claim 1, wherein a two-body model with a zonal coefficient including expressions for non-uniform gravity are employed model to determine satellite position and velocity for determination of vehicle position.

8. The method of claim 1, wherein controlling navigation based on the corrected position is performed during a period when GNSS signals are determined as unavailable for determining position of the vehicle.

9. A device configured for navigation using low-earth orbit satellite (LEO) signals, the device comprising:
   a communications module configured to receive one or more low earth orbit (LEO) satellite signals; and
   a controller, coupled to the communications module, wherein the controller is configured to receive a low-earth orbit (LEO) satellite downlink transmission;
   perform a Doppler frequency measurement on received satellite downlink transmissions to determine a pseudorange rate measurement for a vehicle relative to at least one LEO satellite, wherein a simplified general perturbation model including analytical expressions to propagate a satellite position from an epoch time to a specified future time is employed to determine satellite position and velocity for determination of vehicle position;
   correct position data of a vehicle intertial navigation system (INS) for control of the vehicle, wherein correcting includes determining a corrected position based on the pseudorange rate measurement; and
   control navigation of the vehicle based on the corrected position.

10. The device of claim 9, wherein performing a Doppler frequency measurement includes performing an extended Kalman filter (EKF)-based operation for simultaneous tracking and navigation of a LEO satellite for LEO satellite position and velocity determination.

11. The device of claim 9, wherein the pseudorange rate measurement represents rate of change distance between the vehicle and an LEO satellite, and wherein a LEO satellite propagation model is employed to determine LEO satellite position and velocity.

12. The device of claim 9, wherein clock states of the vehicle and LEO satellites are propagated using a double integrator model driven by process noise.

13. The device of claim 9, wherein correcting position data of the vehicle includes fusing the corrected position with a vehicle orientation, position, and velocity determined by an inertial measurement unit of the inertial navigation system.

14. The device of claim 9, wherein a two-body model including expressions of the satellite acceleration and a standard gravitational parameter are employed to determine satellite position and velocity for determination of vehicle position.

15. The device of claim 9, wherein a two-body model with a zonal coefficient including expressions for non-uniform gravity are employed model to determine satellite position and velocity for determination of vehicle position.

16. The device of claim 9, wherein controlling navigation based on the corrected position is performed during a period when GNSS signals are determined as unavailable for determining position of the vehicle.

* * * * *